(12) United States Patent
Schreiner

(10) Patent No.: US 6,418,241 B1
(45) Date of Patent: Jul. 9, 2002

(54) METHOD FOR DETERMINING ROW CORRECTION VALUES FOR A DIGITAL IMAGE CONVERTER

(75) Inventor: Horst Schreiner, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/166,538

(22) Filed: Oct. 6, 1998

(30) Foreign Application Priority Data

Oct. 22, 1997 (DE) .......................... 197 46 623

(51) Int. Cl.$^7$ .................. G06T 5/00; H05G 1/64; H01L 27/146; G01T 1/24
(52) U.S. Cl. ............ 382/263; 382/275; 378/98; 378/98.2; 378/98.8; 250/370.09
(58) Field of Search ................. 382/275, 263, 382/262, 264, 274, 132, 260; 378/98, 98.2, 98.5, 98.8, 98.12; 250/370.01, 370.08, 370.09; 348/245, 246, 247, 294; 358/463, 474, 482, 406, 461

(56) References Cited

U.S. PATENT DOCUMENTS

| | | | | |
|---|---|---|---|---|
| 4,649,430 A | * | 3/1987 | Hynecek | 348/245 |
| 5,528,043 A | * | 6/1996 | Spivey et al. | 250/370.09 |
| 5,617,461 A | | 4/1997 | Schreiner | 378/98.5 |
| 5,648,660 A | * | 7/1997 | Lee et al. | 250/370.09 |
| 5,969,360 A | * | 10/1999 | Lee | 250/370.09 |
| 6,101,287 A | * | 8/2000 | Corum et al. | 382/274 |

FOREIGN PATENT DOCUMENTS

EP 0 424 111 4/1991 .......... H04N/5/217

\* cited by examiner

*Primary Examiner*—Scott Rogers
(74) *Attorney, Agent, or Firm*—Schiff Hardin & Waite

(57) ABSTRACT

In a method for determining row correction values for a digital image converter, with image points arranged in a matrix in rows and columns, in which a small part is protected against radiation by a covering, in order to form a dark reference zone, row correction values are formed by determining the differences of the image points in the dark reference zone in relation to their environment with defective pixels in the dark reference zone being determined and are suppressed in the determination of the row correction value.

7 Claims, 1 Drawing Sheet

METHOD FOR DETERMINING ROW CORRECTION VALUES FOR A DIGITAL IMAGE CONVERTER

BACKGROUND OF THE INVENTION

1. Field of the Invention

The present invention relates to a method for determining row correction values for a digital image converter having image points arranged in a matrix with rows and columns, in which a small part is protected against radiation by a covering in order to form a dark reference zone.

2. Description of the Prior Art

Digital imaging systems, in which digital image converters replace the previously used analog image converters, are becoming increasingly important in medical technology. In general, image converters of this sort that are used, e.g. a-Si detectors, still cannot be produced without errors. In addition to defective pixels or image points, group (cluster), row and column failures are still found. Thus, for example, column failures are caused by interruptions in the address lines.

In order to limit rejection of detectors, the defective image points can be corrected. For a successful correction, an identification of which pixels are defective and which are good is required.

In German PS 195 27 148, a method is specified for defect recognition in an a-Si panel in which, for the recognition of defective image points, a recursive low-pass filtering according to the unsharp or fuzzy mask principle, with separation of the defects according to rows and columns, is applied in multiple fashion to two images, of which a first image is produced with X-ray radiation without an object and a second image is produced without X-ray radiation.

At the left edge of the image, the beginning of the row in a radiography solid-state detector, e.g. an a-Si detector, there is a non-irradiated edge zone. This dark reference zone is covered in light-tight and radiation-tight fashion, so that even in the bright image no additional signal arises. The signal values of the unilluminated pixels are used for the correction of the row signal. They serve to reduce the row noise and to correct small transients in the offset, and again defects are taken into account so that they do not falsify the row correction.

For example, in the exposure of a pelvis, strongly over-radiated (bloomed) regions can occur between the legs. If these bloomed regions are located in the vicinity of the dark reference zone (DRZ), they nonetheless lead, e.g. by means of light conducted in the substrate or in the carrier material, to an irradiation of the dark reference zone, so-called sub-radiation. This results in a disturbing signal which, given the previous corrections, leads to disadvantages in the row correction in the form of fixed-pattern noise and butting problems. For example, caused by defects in the DRZ, a fixed-pattern row noise can arise above all given a sub-radiation of the DRZ. Moreover, due to the sub-radiation of the DRZ, row-corrected and uncorrected images can differ greatly. Also, given butting, a clearly visible separating line can even arise between two panels if sub-radiation has occurred on one of the panels.

These effects are caused by the insufficient treatment of the defects in the sub-radiated DRZ, and due to the fact that in sub-radiated regions in the DRZ a signal arises that increases strongly toward the image region. This is erroneously subtracted during the correction.

SUMMARY OF THE INVENTION

An object of the present invention is to provide a method of the type described above in which an optimal offset value is produced in each line for the reduction of the line noise.

The object is achieved according to the invention by averaging the differences of the image points in the dark reference zone in relation to their surrounding environment as a row correction value, wherein defective pixels in the DRZ are determined and are suppressed during the determination of the row correction value. By the averaging of the differences for the row correction, which takes into account a particular defect map determined previously on the basis of calibration and/or defect recognition, for each row an optimal correction value is obtained by means of which the row noise (fixed-pattern noise) is reduced.

It has proven advantageous to employ a specific high-pass filtering of the DRZ for the row correction so as to eliminate the low frequencies arising in the DRZ due to the sub-radiation before the row correction. According to the invention, the high-pass filtering of the DRZ can thereby take place in the column direction.

The error rate can be further reduced in an embodiment wherein, given a defect inside the column environment of the DRZ, the pixel located symmetrically with respect to the DRZ is also suppressed during the averaging in the column environment.

The inventive method can contain the following steps:

i. calculation of an average value of the environment of each pixel of the DRZ inside its column, ii. formation of the differences of this pixel to the average values of its environment (high-pass filtering of the column) and iii. formation of the average value of the differences as a correction value.

The determination of row correction values ($k_y$) can take place according to the following equation:

$$k_y = \frac{1}{l}\sum_{x=1}^{l}\left(p_{xy} - \frac{1}{2h+1}\sum_{i=y-h}^{y+h}p_{xi}\right)$$

with $P_{xy}$=pixel column x, row y l=length DRZ and h=filtering level, whereby the elements with defective pixels are left out of consideration.

DESCRIPTION OF THE PREFERRED EMBODIMENTS

Figure 1:
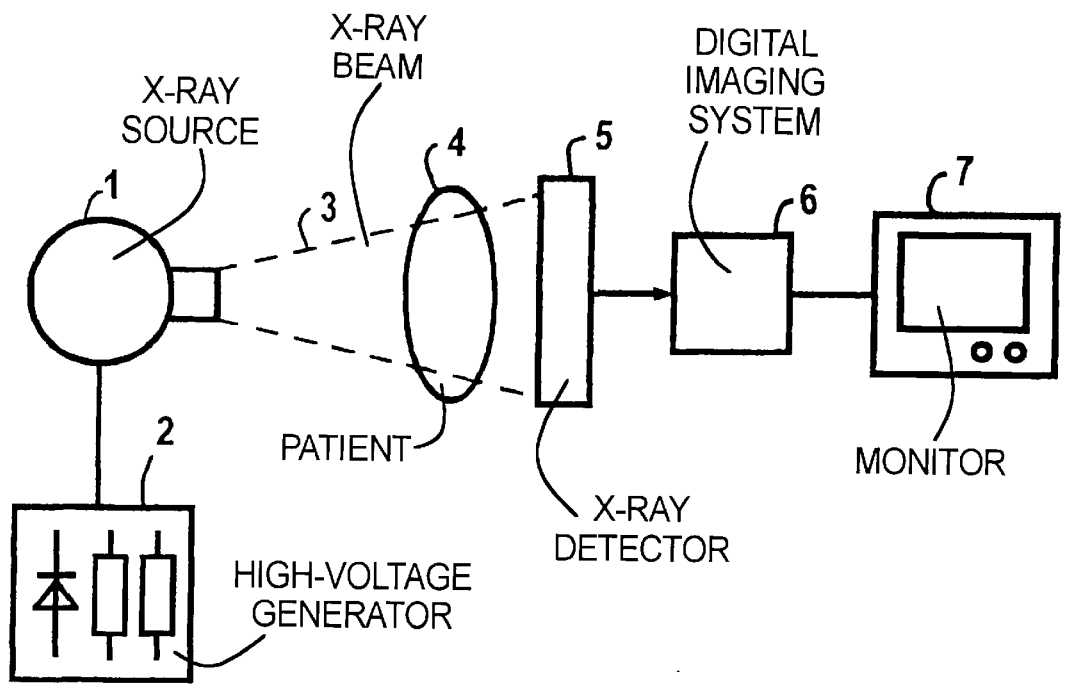
FIG. 1 is a block diagram of an X-ray diagnostic system operable in accordance with the inventive method.

FIG. 1 shows an X-ray diagnostic system with an X-ray tube 1 that is operated by a high-voltage generator 2. The X-ray tube 1 emits an X-ray beam 3 that penetrates a patient 4 and falls on an X-ray detector 5 with an intensity dependent on the transparency of the patient 4.

The X-ray detector 5, e.g. a solid-state image converter made of amorphous silicon (aSi:H), converts the X-ray image into electrical signals, which are processed in a digital imaging system 6 connected thereto and are supplied to a monitor 7 for the reproduction of the X-ray image. The digital imaging system 6 can include processing circuits, converters, difference units, and image memories in a known way.

Figure 2:
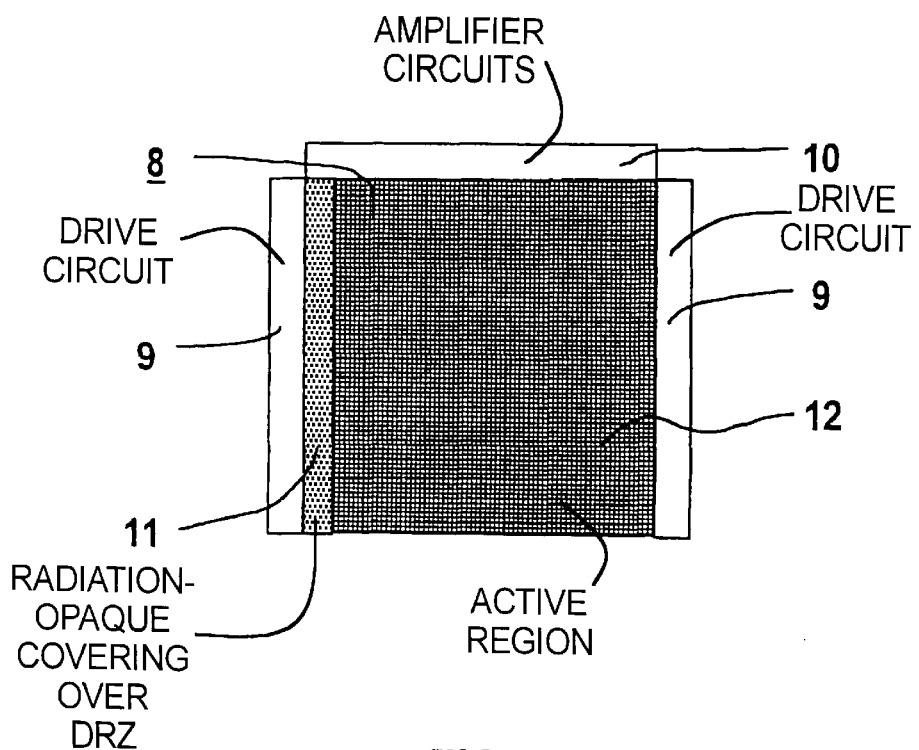
FIG. 2 is a plan view of the X-ray detector in the system of FIG. 1.

FIG. 2 shows the X-ray detector 5. On a glass substrate, photodiodes, made e.g. of amorphous silicon (a-Si), switching elements, such as thin-film transistors or switching diodes, and interconnects are applied in such a way that they form a matrix-type array of n rows and m columns of image elements.

The interconnects for driving the individual image points lead to both sides of the matrix 8 and are connected at those sides with drive circuits 9 via which the switches of the individual image points are supplied with voltage pulses in a known manner. The signal charges produced are read out from the image points via interconnects, are amplified by read-out amplifier circuits 10 arranged on a third side of the matrix 8, and are supplied to further processing circuitry.

As can further be seen from FIG. 2, the side region of the matrix 8 is provided with a radiation-opaque covering 11, under which the pixels of the dark reference zone (DRZ) are located. The active region 12, which is charged with radiation, is located directly adjacent thereto.

Highly over-radiated areas (i.e. areas exhibiting blooming) of the active region 12 immediately adjacent to the DRZ produce a disturbing signal, e.g. due to the conducting of light in the substrate or carrier material in the DRZ.

Conventionally, a simple averaging of the pixel values has been made in the DRZ, taking the defects into account, which averaging forms a correction value for the row.

However, there are two disadvantages to such simple averaging:

Sub-radiation:
  Due to the aforementioned conducting of light from the active irradiated region 12, a signal is also produced in the dark reference zone, so that a false 'zero level' 0 is formed. In addition, the level of this signal is also still strongly dependent on the removal of the active, irradiated pixels from the DRZ.

Defects:
  Particularly in the case of a non-uniform sub-radiation, there occur clear errors in the averaging, depending on the location of the defects in the row, which errors also produce a line noise.

Due to the characteristics of light conductance, the disturbing signal has only low-frequency portions. This additional signal can be eliminated by an inventive high-pass filter. The two basic disadvantages are thereby eliminated, these being:
1. The black level (zero) is falsely corrected; too much is subtracted.
2. Defects in the DRZ additionally falsify the signal: according to the location of the pixel in the DRZ, a value is left out once during the averaging—a fairly low value at the beginning of the DRZ, or, at the end of the DRZ, a high value near the active surface. In this way, there arises an additional row noise portion due to the row clamping.

Due to the aforementioned disadvantages of the conventional correction—fixed-pattern noise and butting problems—an inventive technique is used for row correction in the X-ray detector 5. Instead of simple averaging, the differences in the DRZ pixels in relation to the surrounding environment are averaged, taking the defects into account.

A slight increase in the row noise is offset by the considerable advantages in the treatment of overshot regions.

In basic terms, this averaging corresponds to a high-pass filtering of the DRZ before the formation of the row correction values. That is, low-frequency portions arising from the sub-radiation are suppressed, and do not enter into the correction values.

The inventive formation of the correction value in a row is divided into three steps:

For each pixel of the DRZ, the average value in its environment inside its column is calculated according to the following equation:

$$\overline{M}_{xy} = \frac{1}{2h+1} \sum_{i=y-h}^{y+h} p_{xi}$$

For each pixel of the DRZ, the difference $\Delta_{xy}$ of this pixel from the average value is calculated (high-pass filtering of the column):

$$\Delta_{xy} = (p_{xy} - \overline{M}_{xy}) = \left( p_{xy} - \frac{1}{2h+1} \sum_{i=y-h}^{y+h} p_{xi} \right)$$

The average value of the calculated differences $\Delta_{xy}$ yields the correction value $k_y$:

$$k_y = \frac{1}{l} \sum_{x=1}^{l} (\Delta_{xy})$$

In this way, the row correction value $k_y$ can be calculated according to the following equation:

$$k_y = \frac{1}{l} \sum_{x=1}^{l} \left( p_{xy} - \frac{1}{2h+1} \sum_{i=y-h}^{y+h} p_{xi} \right)$$

with
  $P_{xy}$=pixel column x, row y,
  l=length DRZ and
  h=filtering level.

Defective pixels of the DRZ are not taken into account in the averaging. As a result, significantly less error arises in comparison with the conventional correction, since the differences are more similar to one another than are the absolute values. By means of the suppression of the defective pixels, the number of averaged difference values is additionally reduced.

In order to keep the filter symmetrical, a pixel corresponding to the defective pixel located symmetrically in the DRZ is also excluded from the averaging inside the column environment. In this way, the number of pixels determined in the column is further reduced.

Due to the averaging of the column environment, there results a slightly increased row noise in comparison with the conventional approach:

Factor given filter width w:

$$k = 1 + \frac{1}{\sqrt{w}}$$

Defects can further reduce the effective filter width, so that in some circumstances the factor is somewhat higher.

A global offset, i.e. when the offset changes uniformly in the overall image, is not corrected (frequency 0), however, this can sometimes even be desirable.

The inventive correction operates, for example, with a filter width of 31. The images are amplified e.g. by a factor of 4 in relation to the normal. An offset of 50 LSB, for the avoidance of black compression, is added to all pixels. The zero line is thus located at 50 LSB.

A comparison with a pelvic phantom in a high-dosage mode yielded the following results. Whereas the conventional row correction in the DRZ produced a clear fixed-pattern noise next to an overshot region, nothing is observed in the inventive approach. In the conventional correction, the rows with the overshooting are reduced in relation to a non-row-corrected image in the signal. The difference between an image treated with the inventive correction and a non-row-corrected image is equal almost to zero overall, except for the row noise. No differences in the noise were observed.

Given an exposure made with a sensitive mode, and thus susceptible to strong noise, a slight increase in the noise results.

By means of the inventive row correction with a filter width of 31, the row offset is maintained unaltered. In the non-sub-radiated area, the conventional and inventive corrections differ only in the offset. In the sub-radiated area, the inventive correction exhibits lower noise, plus a significantly different offset, which was erroneously reduced by the conventional correction.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for determining row correction values for a digital image converter having a plurality of pixels arranged in rows and columns in a matrix, said matrix having a dark reference zone comprising a portion of said matrix protected against incident radiation by a covering, said method comprising the steps of:

averaging differences between respective image points in said dark reference zone in relation to their environment to obtain a row correction value; and identifying and suppressing defective pixels in said dark reference zone during said averaging of said differences in said dark reference zone.

2. A method as claimed in claim 1 comprising the additional step of:

high-pass filtering pixel values from said dark reference zone for eliminating low frequencies in said values before determining said row correction value.

3. A method as claimed in claim 2 wherein said columns have a column direction associated therewith, and wherein the step of high-pass filtering comprises high-pass filtering pixel values in said dark reference zone in said column direction.

4. A method as claimed in claim 2 wherein the step of high-pass filtering comprises high-pass filtering pixel values in said dark reference zone using a filter with a filter width of 31.

5. A method as claimed in claim 1, comprising the additional step of:

upon identifying a defective pixel within a column environment of said dark reference zone, in addition to suppressing said defective pixel, suppressing another pixel in said dark reference zone located symmetrically relative to said defective pixel during averaging in said column environment.

6. A method as claimed in claim 1 wherein the step of forming said row correction value comprises:

calculating an average value of an environment of each pixel in said dark reference zone within the column containing each pixel;

forming differences between each pixel and average values of the environment of said pixel; and forming the average value of said differences as said row correction value.

7. A method as claimed in claim 1 wherein the step of determining said row correction value includes filtering said pixels in said dark reference zone and applying the following equation to all non-defective pixels in said dark reference zone:

$$k_y = \frac{1}{l} \sum_{x=1}^{l} \left( p_{xy} - \frac{1}{2h+1} \sum_{i=y-h}^{y+h} p_{xi} \right)$$

wherein $p_{xy}$ identifies a pixel in column x and row y, wherein l is a length of said dark reference zone, and wherein h is a filtering level associated with said filtering.

* * * * *